(12) United States Patent
Park et al.

(10) Patent No.: US 12,529,809 B2
(45) Date of Patent: Jan. 20, 2026

(54) SYSTEM AND METHOD FOR AUTOMATICALLY STORING BORING LOGS INFORMATION USING ARTIFICIAL INTELLIGENCE

(71) Applicant: KOREA INSTITUTE OF CIVIL ENGINEERING AND BUILDING TECHNOLOGY, Goyang-si (KR)

(72) Inventors: Ka-Hyun Park, Seoul (KR); Jin-Tae Han, Seoul (KR); Youngno Yoon, Goyang-si (KR)

(73) Assignee: KOREA INSTITUTE OF CIVIL ENGINEERING AND BUILDING TECHNOLOGY, Goyang-si (KR)

( * ) Notice: Subject to any disclaimer, the term of this patent is extended or adjusted under 35 U.S.C. 154(b) by 610 days.

(21) Appl. No.: 17/993,050

(22) Filed: Nov. 23, 2022

(65) Prior Publication Data
US 2023/0168404 A1    Jun. 1, 2023

(30) Foreign Application Priority Data
Nov. 26, 2021  (KR) .................. 10-2021-0165937

(51) Int. Cl.
*G01V 1/30*   (2006.01)
*G06V 10/44*  (2022.01)
*G06V 10/764* (2022.01)

(52) U.S. Cl.
CPC ............... *G01V 1/30* (2013.01); *G06V 10/454* (2022.01); *G06V 10/764* (2022.01)

(58) Field of Classification Search
CPC ...... G01V 1/30; G06V 10/454; G06V 10/764; G06V 10/82; G06V 30/413; G06V 20/56; G06V 2201/09; G06V 2201/10; G06V 30/10; G06V 30/414; G06V 30/416; G06N 3/04; G06N 3/08; G06N 3/045; G06N 3/084; G06N 3/02; G06N 3/047; G06N 3/048; G01N 33/24; G06Q 50/02; G06T 2207/20081; G06T 5/60; G06T 2207/20084; G06T 2207/30181; G06T 5/77; G06F 40/30; G06F 16/215;
(Continued)

(56) References Cited

U.S. PATENT DOCUMENTS 7,707,009 B2 *  4/2010  Steinke .................. E21B 10/00
                                                   702/182
11,556,739 B2 * 1/2023  Aizawa .................. G06V 10/82
(Continued)

OTHER PUBLICATIONS

Park et al., "A Study on the Automatic Digital DB of Boring Log Using AI", Journal of the Korean Geotechnical Society, vol. 37, No. 11, Nov. 2021, pp. 119-129.

*Primary Examiner* — Michael S Osinski
(74) *Attorney, Agent, or Firm* — KILE PARK REED & HOUTTEMAN PLLC (57) ABSTRACT

The present invention relates to a system and method for automatically storing boring logs information using artificial intelligence. The present invention can make a database of boring logs with high reliability without input errors by training a classification model using various forms of boring logs in advance by using artificial intelligence, identifying a form of a boring log to be actually stored in a database using the classification model when the boring log is input, and then extracting data from the boring log according to the identified form.

9 Claims, 6 Drawing Sheets

(58) Field of Classification Search
CPC .... G06F 16/3329; G06F 16/35; G06F 18/217;
G06F 40/279; G06F 18/214; G06F 40/56;
E21B 47/0025
See application file for complete search history.

(56) References Cited

U.S. PATENT DOCUMENTS

| | | | | |
|---|---|---|---|---|
| 12,032,539 | B2* | 7/2024 | Zeghlache | G06F 16/25 |
| 12,056,171 | B2* | 8/2024 | Sahoo | G06F 40/186 |
| 12,099,154 | B2* | 9/2024 | Gupta | G01V 1/247 |
| 12,154,252 | B2* | 11/2024 | Al Ibrahim | G06N 3/0455 |
| 12,282,462 | B2* | 4/2025 | Pillai | G06N 3/045 |
| 12,366,678 | B2* | 7/2025 | Cisek | A01B 76/00 |
| 2014/0157172 | A1* | 6/2014 | Peery | G06Q 50/02 |
| | | | | 715/771 |
| 2014/0316768 | A1* | 10/2014 | Khandekar | G06F 16/3329 |
| | | | | 704/9 |
| 2014/0318866 | A1* | 10/2014 | Lewis | E21B 10/00 |
| | | | | 175/40 |
| 2017/0320182 | A1* | 11/2017 | Jeong | B23Q 17/098 |
| 2017/0352199 | A1* | 12/2017 | Finley | G06T 7/13 |
| 2018/0276462 | A1* | 9/2018 | Davis | G06V 30/15 |
| 2019/0050948 | A1* | 2/2019 | Perry | G06Q 30/02 |
| 2019/0074082 | A1* | 3/2019 | Buckler | G06F 40/56 |
| 2020/0134380 | A1* | 4/2020 | Xu | G06V 10/454 |
| 2020/0184214 | A1* | 6/2020 | Casas | G06N 3/126 |
| 2020/0265615 | A1* | 8/2020 | Di Santo | E21B 49/00 |
| 2020/0279108 | A1* | 9/2020 | Shorter | G06F 40/279 |
| 2021/0165963 | A1* | 6/2021 | Mendes | G06F 40/279 |
| 2021/0295031 | A1* | 9/2021 | Shorter | G06F 16/35 |
| 2021/0381362 | A1* | 12/2021 | Cha | E21B 47/04 |
| 2021/0382191 | A1* | 12/2021 | Cha | G01V 1/282 |
| 2022/0010675 | A1* | 1/2022 | Yin | G06T 5/60 |
| 2022/0121843 | A1* | 4/2022 | Song | G06V 10/22 |
| 2022/0148051 | A1* | 5/2022 | Bagnall | G06Q 40/08 |
| 2022/0156300 | A1* | 5/2022 | Paruchuri | G06V 30/416 |
| 2022/0222239 | A1* | 7/2022 | Al Ismail | E21B 49/00 |
| 2022/0222284 | A1* | 7/2022 | Sahoo | G06F 16/316 |
| 2022/0277176 | A1* | 9/2022 | Bhatia | G06N 3/045 |
| 2022/0309813 | A1* | 9/2022 | Melchy | G06N 3/045 |
| 2023/0036713 | A1* | 2/2023 | Pattnaik | G06T 5/60 |
| 2023/0252224 | A1* | 8/2023 | Tran | G06F 40/56 |
| | | | | 715/256 |
| 2023/0315846 | A1* | 10/2023 | Ben David | H04L 63/1441 |
| | | | | 726/22 |
| 2023/0316756 | A1* | 10/2023 | Wang | G06V 20/35 |
| | | | | 382/128 |
| 2024/0219365 | A1* | 7/2024 | Wang | G01R 27/02 |
| 2025/0209227 | A1* | 6/2025 | Tao | G06F 30/13 |

* cited by examiner

| PROJECT NAME | BOREHOLE NAME | X | Y | TEST DEPTH | STANDARD PEENTRATION TEST _NUMBER OFHITS | STANDARD PEENTRATION TEST _PENETRATION DEPTH |
|---|---|---|---|---|---|---|
| Preparation of optimal construction plan and basic design service for Yeongjong and Cheongna connection road (the 3rd overland bridge) | NBB-18 | 546523.054 | 164964.170 | 1 | 7 | 30 |
| Preparation of optimal construction plan and basic design service for Yeongjong and Cheongna connection road (the 3rd overland bridge) | NBB-18 | 546523.054 | 164964.170 | 3 | 11 | 30 |
| Preparation of optimal construction plan and basic design service for Yeongjong and Cheongna connection road (the 3rd overland bridge) | NBB-18 | 546523.054 | 164964.170 | 4 | 9 | 30 |
| Preparation of optimal construction plan and basic design service for Yeongjong and Cheongna connection road (the 3rd overland bridge) | NBB-18 | 546523.054 | 164964.170 | 5 | 17 | 30 |
| Preparation of optimal construction plan and basic design service for Yeongjong and Cheongna connection road (the 3rd overland bridge) | NBB-18 | 546523.054 | 164964.170 | 6 | 24 | 30 |
| Preparation of optimal construction plan and basic design service for Yeongjong and Cheongna connection road (the 3rd overland bridge) | NBB-18 | 546523.054 | 164964.170 | 7 | 9 | 30 |
| Preparation of optimal construction plan and basic design service for Yeongjong and Cheongna connection road (the 3rd overland bridge) | NBB-18 | 546523.054 | 164964.170 | 8 | 5 | 30 |
| Preparation of optimal construction plan and basic design service for Yeongjong and Cheongna connection road (the 3rd overland bridge) | NBB-18 | 546523.054 | 164964.170 | 9 | 4 | 30 |
| Preparation of optimal construction plan and basic design service for Yeongjong and Cheongna connection road (the 3rd overland bridge) | NBB-18 | 546523.054 | 164964.170 | 10 | 15 | 30 |
| Preparation of optimal construction plan and basic design service for Yeongjong and Cheongna connection road (the 3rd overland bridge) | NBB-18 | 546523.054 | 164964.170 | 11 | 11 | 30 |
| Preparation of optimal construction plan and basic design service for Yeongjong and Cheongna connection road (the 3rd overland bridge) | NBB-18 | 546523.054 | 164964.170 | 12 | 17 | 30 |
| Preparation of optimal construction plan and basic design service for Yeongjong and Cheongna connection road (the 3rd overland bridge) | NBB-18 | 546523.054 | 164964.170 | 13 | 5 | 30 |
| Preparation of optimal construction plan and basic design service for Yeongjong and Cheongna connection road (the 3rd overland bridge) | NBB-18 | 546523.054 | 164964.170 | 14 | 6 | 30 |
| Preparation of optimal construction plan and basic design service for Yeongjong and Cheongna connection road (the 3rd overland bridge) | NBB-18 | 546523.054 | 164964.170 | 15 | 6 | 30 |
| Preparation of optimal construction plan and basic design service for Yeongjong and Cheongna connection road (the 3rd overland bridge) | NBB-18 | 546523.054 | 164964.170 | 16 | 7 | 30 |
| Preparation of optimal construction plan and basic design service for Yeongjong and Cheongna connection road (the 3rd overland bridge) | NBB-18 | 546523.054 | 164964.170 | 17 | 6 | 30 |

FIG. 6

| BOREHOLE NAME | ELEVATION | DEPTH | STRATUM THICKNESS | STRATUM NAME | SOIL COLOR | STRATUM DESCRIPTION | USCS | detail | new USCS |
|---|---|---|---|---|---|---|---|---|---|
| NBB-14 | -17.95 | 4.80 | 4.8 | Sedimentary layer | Dard gray | Silty Clay | CL | ['Silty Clay', 'Dard gray,Wet,Very soft'] | CH |
| NBB-14 | -26.55 | 13.40 | 8.6 | Sedimentary layer | Dark brown | Silty Sand | SM | ['Silty Sand,Gravel contains', 'Dark brown,Loose to medium dense'] | SM |
| NBB-14 | -27.15 | 14 | 0.6 | Weathered soil | Dark brown | Silty Sand | SM | ['Silty Sand,Dark brown,Dampness', 'Fully weathered condition'] | SM |
| NBB-14 | -30.05 | 16.90 | 2.9 | Weathered rock | Dark brown | Weathering zone of bedrock | | ['Weathering zone of bedrock,Dark brown,Dampness', 'Partially dike inter-bedded', 'Deep weathered to fully weathered'] | WR |
| NBB-14 | -36.15 | 23 | 6.1 | Soft rock layer | Dard gray | Schist | | ['Schist,Dard gray', 'Moderate weathering to Severe weathering', 'Moderate strong to weak', 'Jointandcrackdevelopment','16.9~18.0m','TCR:59%RQD:0%'] | SR |
| NBB-15 | -25.07 | 8.40 | 8.4 | Sedimentary layer | Dard gray | Silty Clay | CL | ['Silty Clay', 'Dard gray,Wet,Very soft'] | CH |
| NBB-15 | -29.37 | 12.70 | 4.3 | Sedimentary layer | Dark brown | Silty Sand | SM | ['Silty Sand,Gravel contains', 'Dark brown,Loose to medium dense'] | SM |
| NBB-15 | -32.17 | 15.50 | 2.8 | Weathered soil | Dark brown | Silty Sand | SM | ['Silty Sand, Dark brown,Dampness,dense~very dense', 'Fully weathered condition'] | SM |
| NBB-15 | -33.17 | 16.50 | 1 | Weathered rock | Dark brown | Weathering zone of bedrock | | ['Weathering zone of bedrock,Dark brown,Dampness', 'Partially dike inter-bedded', 'Deep weathered to fully weathered'] | WR |
| NBB-15 | -39.17 | 22.50 | 6 | Soft rock layer | Dard gray | Schist | | ['Schist,Dard gray', 'Moderate weathering to Severe weathering', 'Moderate strong to weak', 'Jointandcrackdevelopment','16.5~18.5m','TCR:50%RQD:43%'] | SR |
| NBB-16 | -9.70 | 0.80 | 0.8 | Sedimentary layer | Dark brown | Silty Sand | SM | ['Silty Sand,Gravel contains,Dark brown,Dampness'] | SM |
| NBB-16 | -17.30 | 8.40 | 7.6 | Sedimentary layer | Dard gray | Silty Clay | CL | ['Silty Clay', 'Dard gray,Wet,Very soft'] | CH |
| NBB-16 | -18.50 | 9.60 | 1.2 | Sedimentary layer | Dark brown | Silty Sand | SM | ['Silty Sand,Gravel contains', 'Dark brown,Dampness,medium dense'] | SM |
| NBB-16 | -19.90 | 11.00 | 1.4 | Weathered soil | Dark brown | Silty Sand | SM | ['Silty Sand, Dark brown,Dampness,dense', 'Fully weathered condition', 'Weathered rock'] | SM |
| NBB-16 | -21.30 | 12.40 | 1.4 | Weathered rock | Dark brown | Weathering zone of bedrock | | ['Weathering zone of bedrock,Dark brown,Dampness', 'Partially dike inter-bedded', 'Deep weathered to fully weathered'] | WR |
| NBB-16 | -27.30 | 18.40 | 6 | Soft rock layer | Dard gray | Schist | | ['Schist,Dard gray', 'Moderate weathering to Severe weathering', 'Moderate strong to weak', 'Joint and crack development', '12.4~15.4m', 'TCR:83%RQD:11%', '15.4~18.4m', 'TCR:83%RQD:12%'] | SR |
| NBB-17 | -16.60 | 12.40 | 12.4 | Sedimentary layer | Dard gray | Silty Clay | CL | ['Silty Clay', 'Dard gray,Wet,Very soft'] | CH |
| NBB-17 | -21.20 | 17.00 | 4.6 | Weathered soil | Dark brown | Silty Sand | SM | ['Silty Sand, Dark brown,Dampness,dense~very dense', 'fully weathered'] | SM |
| NBB-17 | -21.40 | 17.20 | 0.2 | Weathered rock | Dark brown | Weathering zone of bedrock | | ['Weathering zone of bedrock,Dark brown,Dampness', 'Deep weathered to fully weathered'] | WR |
| NBB-17 | -24.40 | 20.20 | 3 | Soft rock layer | Dark brown | Schist | | ['Schist,Dard gray', 'Moderate weathering to Moderate weathering', 'slight weathering to Moderate weathering'] | SR |
| NBB-17 | -27.40 | 23.20 | 3 | hard rock layer | Dark brown | Schist | | ['Schist,Dard gray', 'slight weathering to Moderate weathering', 'strong to Moderate strong', 'Joint and crack development', 'TCR:100%RQD:92%'] | HR |

SYSTEM AND METHOD FOR
AUTOMATICALLY STORING BORING LOGS
INFORMATION USING ARTIFICIAL
INTELLIGENCE

CROSS-REFERENCE TO RELATED
APPLICATIONS

This U.S. non-provisional patent application claims priority under 35 U.S.C. § 119 of Korean Patent Application No. 10-2021-0165937, filed on Nov. 26, 2021, the entire contents of which are hereby incorporated by reference.

FIELD OF THE INVENTION

The present invention disclosed herein relates to a system and method for automatically storing information, and more particularly, to a system and method for automatically extracting and storing boring logs information to build a database.

BACKGROUND ART

The Ministry of Land, Infrastructure and Transport collects ground survey data, and operates and manages the land geotechnical information portal system for the purpose of systematically managing and sharing geotechnical information. This has various effects, such as preventing duplicate surveys, reducing budgets, and improving the usability of geotechnical information.

Recently, the application scope of results of the ground survey is gradually expanding to design, construction, underground safety management, disaster fields, and the like, and in particular, the application of ground information is rapidly increasing due to the increase in the occurrence of earthquakes and underground safety accidents such as ground subsidence and sink.

As such, the conversion of paper documents (scanned documents) into a digital database (DB) is a trend that is occurring simultaneously in each field, such as the government's data dam construction project, as well as in the construction field. The reason is that, in the era of the fourth industrial revolution, it is important to construct a large amount of high-quality big data in order to analyze data using machine learning or deep learning and to derive meaningful results.

Meanwhile, in the field of geotechnical engineering, it can be seen that the information has been managed and utilized as a digital DB for quite a long time since geotechnical information has been converted into a DB and started to be disseminated in 2007. Nevertheless, the process of building the current data into a DB consumes a lot of human and time resources and frequently causes problems with accuracy because a person directly sees the PDF file and types it one by one.

Geotechnical information provided by the land geotechnical information portal system includes project information, topographical geology information, borehole information, stratum information, field test information, physical property test information, soil test information, rock test information, exploration geophysics information, surface geophysics information, expert opinion information, or the like. Among them, a boring log, as the final outcome of the boring survey, which is the result of recording the ground condition with the depth for each survey location, is the required entry in the database built in the land geotechnical information portal system, and thus it occupies most of the database, and the utilization of the result is very high.

In particular, the standard penetration test (SPT), which is recorded in the boring log, is one of the most commonly used field tests, and presents several empirical formulas that is possible to calculate a ground constant based on an N value calculated through the standard penetration test in the design standards. Therefore, as the result of the standard penetration test in the boring log, geotechnical information, such as stratum information and groundwater level, has to be converted into a proper database in order to secure the reliability of the result when the ground constant is used.

However, the format of the boring logs may be different for each structure and ordering organization, and may be also different depending on the time of writing or the company. Currently, the operator visually checks the boring log and directly types and inputs the relevant contents, and as a consequence, errors and omissions of information occur frequently.

SUMMARY OF THE INVENTION

To solve the above-mentioned limitations, the present invention provides a system and method for automatically storing boring logs information using artificial intelligence capable of creating a highly reliable database of boring logs by more accurately extracting information included in the boring logs and automatically storing the extracted information.

In accordance with an embodiment of the present invention, there is disclosed a method for automatically storing boring logs information using artificial intelligence that is performed in a system for automatically storing boring logs information, the method including: a step (a) of training a deep learning-based classification model by converting a plurality of boring log files into images; a step (b) of generating form information by applying, to the classification model, a boring log input for information extraction to identify a form of the boring log; a step (d) of extracting basic information and extracting at least one of standard penetration test (SPT) information and stratum information, from the boring log according to the form information; and a step (e) of generating data to be stored in a database using the extracted information.

In addition, the method may further include, between the step (b) and the step (d), a step (c) of selecting information to be extracted from among the SPT information and the stratum information and generating a data frame including basic information and selected information, and the step (d) may include extracting the basic information and the information selected in the step (c), and the step (e) may include generating data to be stored in the database by inserting the information extracted in the step (d) into the data frame generated in the step (c).

In addition, the step (c) may include converting the boring log into a text file, and the step (d) may include extracting information by searching for a character string of an item corresponding to data to be extracted and determining a location of the data to be extracted according to the form information.

In addition, the step (d) may include extracting unified soil classification system (USCS) information by estimating a USCS from a major constituent material and a minor constituent material in a strata detailed description when the USCS information is not included in the stratum information in the boring log.

In addition, the step (d) may include extracting the USCS information by estimating the USCS by substituting the major constituent material and the minor constituent material in the strata detailed description into the following table when the USCS information is not included in the stratum information in the boring log.

| Major constituent | Major classification | Minor constituent | Minor classification | USCS |
|---|---|---|---|---|
| Gravel | G | Sand | W (or P) | GW (or GP) |
| | | Silt | M | GM |
| | | Clay | C | GC |
| Sand | S | Gravel | W (or P) | SW (or SP) |
| | | Silt | M | SM |
| | | Clay | C | SC |
| Silt | M | Gravel | L | ML |
| | | Sand | L | ML |
| | | Clay | H | MH |
| Clay | C | Gravel | L | CL |
| | | Sand | L | CL |
| | | Silt | H | CH |

In addition, the step (a) may include converting a plurality of boring log portable document format (PDF) files into JPG image files, performing the training in a k-fold validation method by inputting the converted JPG image files into a convolution neural network (CNN) type classification model, and verifying performance by using a confusion matrix.

In accordance with an embodiment of the present invention, there is disclosed a computer program that is stored in a non-transitory storage medium and executed in a computer including a processor, the computer program performing the method for automatically storing boring logs information using artificial intelligence.

In accordance with an embodiment of the present invention, there is disclosed a system for automatically storing boring logs information using artificial intelligence, the system including: an image conversion unit configured to convert a boring log of a predefined file format into an image; a classification model trained using a plurality of boring logs converted into images, and configured to identify a form of a boring log from which information is to be extracted and output form information when an image of the boring log is input; a basic information extraction unit configured to extract basic information from the boring log according to the form information; a standard penetration test (SPT) information extraction unit configured to extract SPT information from the boring log according to the form information; a stratum information extraction unit configured to extract stratum information from the boring log according to the form information; and a data generation unit configured to generate data to be stored in a database using the extracted information.

In addition, the system may further include a date frame generation unit configured to, when information to be extracted is selected from among the SPT information and the stratum information, generate a data frame including basic information and selected information, and the data generation unit may generate data to be stored in the database by inserting the basic information extracted by the basic information extraction unit and information extracted by at least one of the SPT information extraction unit and the stratum information extraction unit into the data frame.

In addition, the system may further include a file conversion unit configured to convert the boring log into a text file and output the converted text file to the basic information extraction unit, the SPT information extraction unit, and the stratum information extraction unit, and the basic information extraction unit, the SPT information extraction unit, and the stratum information extraction unit may extract information by searching for a character string of an item corresponding to data to be extracted and determining a location of the data to be extracted according to the form information.

In addition, the stratum information extraction unit may extract unified soil classification system (USCS) information by estimating a USCS from a major constituent material and a minor constituent material in a strata detailed description when the USCS information is not included in the stratum information in the boring log.

In addition, the stratum information extraction unit may extract the USCS information by estimating the USCS by substituting the major constituent material and the minor constituent material in the strata detailed description into the following table when the USCS information is not included in the stratum information in the boring log.

| Major constituent | Major classification | Minor constituent | Minor classification | USCS |
|---|---|---|---|---|
| Gravel | G | Sand | W (or P) | GW (or GP) |
| | | Silt | M | GM |
| | | Clay | C | GC |
| Sand | S | Gravel | W (or P) | SW (or SP) |
| | | Silt | M | SM |
| | | Clay | C | SC |
| Silt | M | Gravel | L | ML |
| | | Sand | L | ML |
| | | Clay | H | MH |
| Clay | C | Gravel | L | CL |
| | | Sand | L | CL |
| | | Silt | H | CH |

In addition, the classification model may be implemented as a convolution neural network (CNN), and may perform the training in a k-fold validation method by receiving JPG image files into which a plurality of boring log portable document format (PDF) files are converted and verify performance by using a confusion matrix.

In accordance with an embodiment of the present invention, there is disclosed a system for automatically storing boring logs information using artificial intelligence, the system including a processor and a memory configured to store predetermined instructions, in which the processor executing the instructions stored in the memory executes: a step (a) of training a deep learning-based classification model by converting a plurality of boring log files into images; a step (b) of generating form information by applying, to the classification model, a boring log input for information extraction to identify a form of the boring log; a step (d) of extracting basic information and extracting at least one of standard penetration test (SPT) information and stratum information, from the boring log according to the form information; and a step (e) of generating data to be stored in a database using the extracted information.

In addition, the processor may further execute, between the step (b) and the step (d), a step (c) of selecting information to be extracted from among the SPT information and the stratum information and generating a data frame including basic information and selected information, in the step (d), the processor may extract the basic information and the information selected in the step (c), and in the step (e), the processor may generate data to be stored in the database by inserting the information extracted in the step (d) into the data frame generated in the step (c).

In addition, in the step (c), the processor may convert the boring log into a text file, and in the step (d), the processor may extract information by searching for a character string of an item corresponding to data to be extracted and determining a location of the data to be extracted according to the form information.

In addition, in the step (d), the processor may extract unified soil classification system (USCS) information by estimating a USCS from a major constituent material and a minor constituent material in a strata detailed description when the USCS information is not included in the stratum information in the boring log.

In addition, in the step (d), the processor may extract the USCS information by estimating the USCS by substituting the major constituent material and the minor constituent material in the strata detailed description into the following table when the USCS information is not included in the stratum information in the boring log.

| Major constituent | Major classification | Minor constituent | Minor classification | USCS |
|---|---|---|---|---|
| Gravel | G | Sand | W (or P) | GW (or GP) |
| | | Silt | M | GM |
| | | Clay | C | GC |
| Sand | S | Gravel | W (or P) | SW (or SP) |
| | | Silt | M | SM |
| | | Clay | C | SC |
| Silt | M | Gravel | L | ML |
| | | Sand | L | ML |
| | | Clay | H | MH |
| Clay | C | Gravel | L | CL |
| | | Sand | L | CL |
| | | Silt | H | CH |

In addition, in the step (a), the processor may convert a plurality of boring log portable document format (PDF) files to JPG image files, perform the training in a k-fold validation method by inputting the converted JPG image files into a convolution neural network (CNN) type classification model, and verify performance by using a confusion matrix.

BRIEF DESCRIPTION OF THE DRAWINGS

FIG. 5 is a diagram showing an example of a data file generated by extracting basic information and SPT information; and FIG. 6 is a diagram showing an example of a data file generated by extracting stratum information.

DETAILED DESCRIPTION OF THE PREFERRED EMBODIMENTS

Hereinafter, preferred embodiments of the present invention will be described with reference to the drawings.

Here, the above-mentioned objects, features and advantages of the present invention will become more apparent through the following detailed description in conjunction with the accompanying drawings. However, it is to be understood that the present invention may be variously modified and embodied, and thus particular embodiments thereof will be illustrated in the drawings and described in detail.

In the drawings, the thicknesses of layers and regions are exaggerated for clarity, and further, references to an element or layer being "on" or "above" another element or layer may include a case of there being an intervening element or layer therebetween as well as a case of the element or layer being directly on top of the other element or layer. Like reference numerals throughout the specification refer to like elements in principle. In addition, components having the same function within the scope of the same idea shown in the drawings of each embodiment will be described using the same reference numerals.

When it is determined that the detailed description of the known technology or configuration related to the present invention may unnecessarily obscure the subject matter of the present invention, the detailed description thereof will be omitted. In addition, numbers (e.g., first, second, and the like) used in the description of the present specification are only identifier codes for distinguishing one component from other components.

Figure 1:
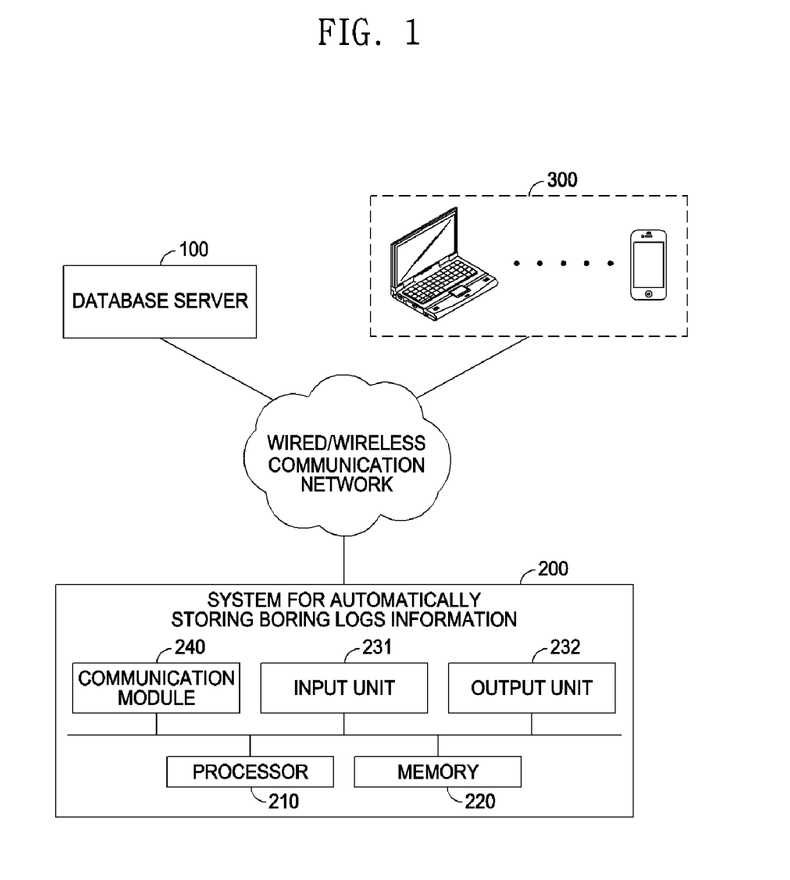
FIG. 1 is a view for describing a physical configuration and connection relationship of a system for automatically storing boring logs information using artificial intelligence in accordance with a preferred embodiment of the present invention.

FIG. 1 is a view for describing a physical configuration and connection relationship of a system for automatically storing boring logs information using artificial intelligence in accordance with a preferred embodiment of the present invention.

Referring to FIG. 1, a system 200 for automatically storing boring logs information using artificial intelligence in accordance with a preferred embodiment of the present invention (hereinafter, abbreviated as "automatic storage system") is connected to a database server 100 and a plurality of user terminals 300 through a wired/wireless communication network.

The database server 100 may manage original data for boring logs and provide the original data for boring logs to the automatic storage system 200 of the present invention. In addition, the database server 100 may receive boring logs information stored in a predefined format (e.g., Microsoft's EXCEL file format) from the automatic storage system 200 of the present invention, and store and manage the boring logs information inside. When the database server 100 is configured to manage boring log-related information, the database server 100 is not limited in its implementation method, and may be implemented as the land geotechnical information portal system.

The user terminals 300, which are terminal device operated by individual users who have created the boring logs and having a capacity of connecting to the wired/wireless communication network, may be implemented as a personal PC, a laptop computer, a smartphone, or the like, and may provide the boring logs stored therein to the automatic storage system 200.

The system 200 for automatically storing boring logs information using artificial intelligence (hereinafter, abbreviated as "automatic storage system") includes a communication module 240, a processor 210, a memory 220, an input unit 231, and an output unit 232 as physical components.

The memory 220 in accordance with a preferred embodiment of the present invention may store instructions executable by the processor 210 and programs executed by the processor 210, and store input/output data. The memory 220 may be replaced by operating a web storage or a cloud server performing a function of a storage medium on the Internet.

In addition, the memory 220 may store the original data for the boring logs received from the database server 100 and the user terminal 300, and may store boring logs information extracted and generated from the boring logs.

The processor 210 in accordance with a preferred embodiment of the present invention may be implemented as a central processing unit (CPU) or a similar device, and performs each of steps of a method for automatically storing boring logs information using artificial intelligence (hereinafter, abbreviated as "automatic storage method"), which will be described later with reference to FIGS. 2 to 6, by executing instructions stored in the memory 220.

Meanwhile, the input unit 231 may be implemented as a typical input means such as a mouse and a keyboard, and may receive setting information, selection information, or the like, from the user and output received information to the processor 210.

The output unit 232 may be implemented as a monitor to display the data generated by the processor 210 to the user.

The communication module 240 performs communication with the database server 100 and the user terminal 300 through the wired/wireless communication network under the control of the processor 210.

Figure 2:
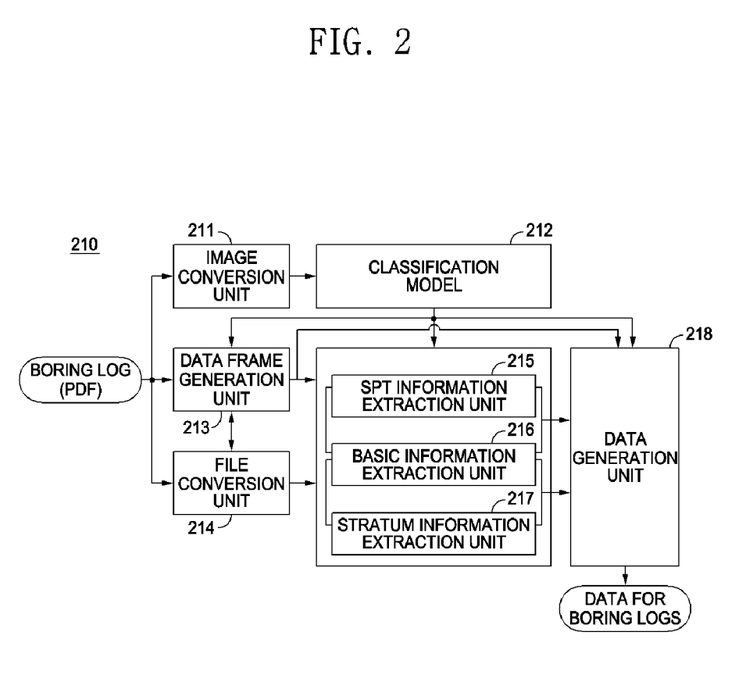
FIG. 2 is a functional block diagram conceptually showing functions performed by a processor when a program for automatically storing boring logs information using artificial intelligence that is stored in a memory is executed in the processor in accordance with a preferred embodiment of the present invention.
Figure 3:
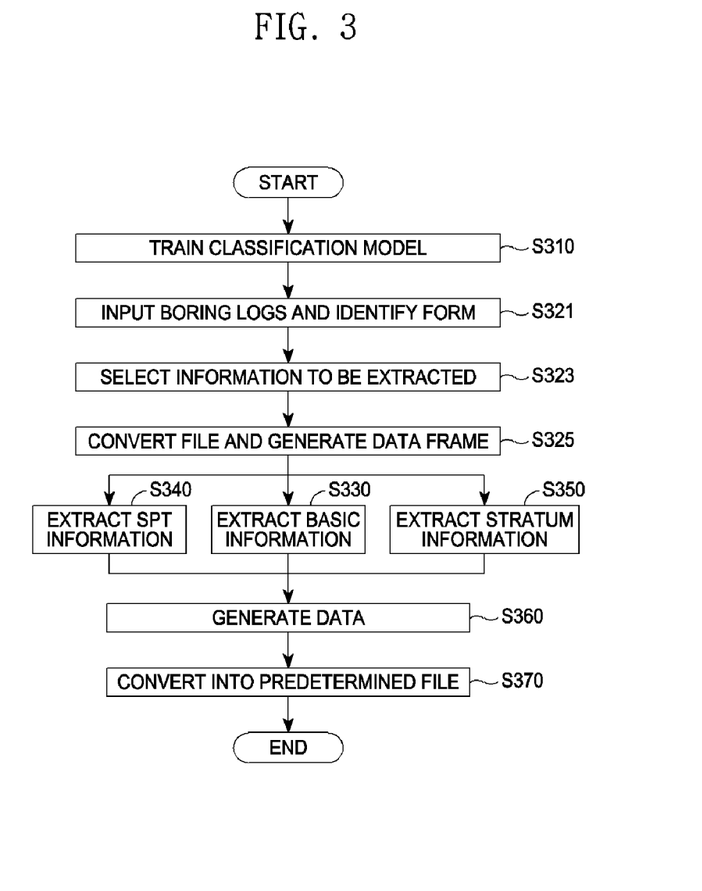
FIG. 3 is a flowchart illustrating a method for automatically storing boring logs information using artificial intelligence in accordance with a preferred embodiment of the present invention.
Figure 4:
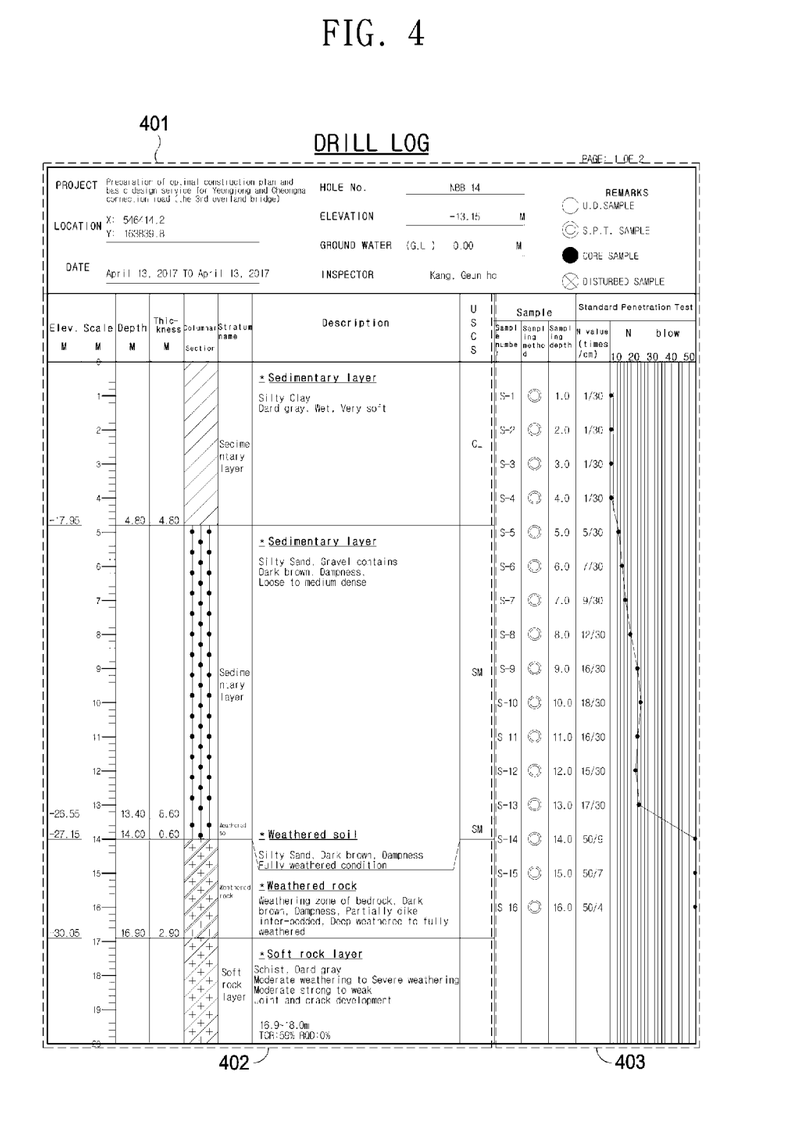
FIG. 4 is a diagram showing an example of a drill log.

FIG. 2 is a functional block diagram conceptually showing functions performed by a processor when a program for automatically storing boring logs information using artificial intelligence that is stored in a memory is executed in the processor in accordance with a preferred embodiment of the present invention, FIG. 3 is a flowchart illustrating a method for automatically storing boring logs information using artificial intelligence in accordance with a preferred embodiment of the present invention, and FIG. 4 is a diagram showing an example of a boring log(drill log).

Referring to FIGS. 2 to 4, the processor 210 by which the program is executed functionally includes an image conversion unit 211, an artificial intelligence-based classification model 212, a data frame generation unit 213, and a file conversion unit 214, a basic information extraction unit 216, an SPT information extraction unit 215, a stratum information extraction unit 217, and a data generation unit 218. Here, it should be noted that the functions performed by the elements shown in FIG. 2 are performed by the processor 210, which is a physical element.

First, in order to provide a service for automatically storing boring logs information in accordance with a preferred embodiment of the present invention, the present invention trains the deep learning-based classification model 212 using various boring logs.

As described above, boring logs are different for each structure and each ordering organization, and as a consequence, many types of boring logs are currently in use, and for each boring log, the arrangement of information is different and the type of information it contains is also somewhat different. Therefore, in order to reduce errors when the input of the boring log is received and stored in the database, it is necessary to identify the form of the corresponding boring log in advance.

To this end, in a preferred embodiment of the present invention, as a method for recognizing and classifying the form of each boring log as an image rather than text, a deep learning model ResNet 34 with a convolution neural network (CNN) is fine-tuned and is used as the classification model 212 that enables classification of forms of boring logs.

In the present invention, the operation of training the classification model 212 is first performed (S310) by the processor 210. In the training operation, the image conversion unit 211 of the processor 210 converts a plurality of boring logs input in a predetermined file format (e.g., portable document format (PDF)) into images and applies the converted images to the classification model 212 for training.

In a preferred embodiment of the present invention, the PDF files of the plurality of boring logs are converted into JPG image files, and the training is performed by inputting the JPG image files into the CNN-type classification model, where a k-fold validation method is applied. The present invention is applied in 4-fold, and the performance thereof is verified using a confusion matrix.

Meanwhile, when the training operation is completed and the boring logs to be stored in the database are input, the image conversion unit 211 of the processor 210 converts a boring log input in a predetermined file format (e.g., PDF) into an image and applies the converted image to the classification model 212, and the classification model 212 identifies and outputs the form of the boring log (S321).

Then, the automatic storage system 200 receives a selection of information to be extracted from an administrator or a user (S323). As described above, the boring log includes basic information, standard penetration test (SPT) information, and stratum information, and thus, as needed, the user may extract only the basic information 401 and the SPT information 403 and store them in the database in association with each other, may extract only the basic information 401 and the stratum information 402 and store them in the database in association with each other, and may extract all of the basic information 401, the SPT information 403, and the stratum information 402 and store them in the database in association with one another. Accordingly, the user may select either one of the SPT information and the stratum information, or both.

Then, the file conversion unit 214 of the processor 210 converts the input boring log file into a text file, and the data frame generation unit 213 of the processor 210 generates a data frame including information selected by the user (S325).

When the user selects only SPT information in step S323, the data frame generation unit 213 of the processor 210 generates data frame including a construction name (project name), a hole number (borehole name), and a location (X, Y coordinates) as basic information, and including test depth, standard penetration test blow count, standard penetration test penetration depth, and the like, as SPT information.

In addition, when the user selects only the stratum information in step S323, the data frame generation unit 213 of the processor 210 generates a data frame including a construction name (project name), a hole number (borehole name), and a location (X, Y coordinates) as basic information, and including elevation, depth, stratum thickness, stratum name, soil color, and a unified soil classification system (USCS) as stratum information.

In addition, when the user selects both the SPT information and the stratum information in step S323, the data frame generation unit 213 of the processor 210 generates a data frame including all of the above information.

Then, the basic information extraction unit 216 of the processor 210 extracts data corresponding to the basic information by searching for a character string of an item corresponding to the data to be extracted according to the form information for the boring log that has been input from the classification model 212 (S330).

Specifically, to store basic information, the basic information extraction unit 216 of the processor 210 generates a basic information dictionary ('project', 'hole_no', 'x', 'y'), searches for a character string related to the project name ('plan name', 'survey name', 'construction name', 'project name', and the like), confirms the location of the information to be extracted according to the form information, extracts the information of the corresponding location, and then stores the extracted information in 'project' in the dictionary included in the basic information.

In the same way, the basic information extraction unit 216 of the processor 210 extracts the basic information in a way that searches for a location item related character string ('location', 'survey site', 'borehole coordinates', and the like), confirms the location of the coordinate data according to the form information, and then extracts an x-coordinate value written at the location and stores the x-coordinate value in the 'x' value in the basic information dictionary and extracts a y-coordinate value at the location and stores the y-coordinate value in the 'y' value in the basic information dictionary, and further, searches for a character string (hole_no', 'borehole name', and the like) related to the borehole name, extracts the corresponding information, and then stores the extracted information in the 'hole_no' value in the basic information dictionary.

Here, the basic information extraction unit 216 of the processor 210 receives the form information from the classification model 212, and thus may ascertain the location of information to be extracted from the character string that has been searched for. For example, in the example shown in FIG. 4, the basic information extraction unit 216 of the processor 210 searches for the character string "hole number". Then, there are character strings to the left, right, and bottom of the "hole number", and the basic information extraction unit 216 of the processor 210 knows from the form information that the actual hole number data in the corresponding form is located on the right side of the character string "hole number" that has been searched for, and accordingly, extracts and stores "BH-1" as the hole number.

Meanwhile, the SPT information extraction unit 215 of the processor 210 extracts data corresponding to the SPT information by searching for a character string corresponding to the item to be extracted according to the form information for the boring log that has been input from the classification model 212 (S340).

The SPT information extraction unit 215 of the processor 210 generates, as a dictionary, 'test depth', 'standard penetration test blow count', and 'standard penetration test penetration depth' to be included in the SPT information, searches for a character string corresponding to the item to be extracted, confirms the location of the information to be extracted according to the form information and extracts information of the confirmed location, and stores the extracted information as 'test depth', 'standard penetration test blow count', and 'standard penetration test_penetration depth' values in the dictionary of the SPT information.

In the same way, the stratum information extraction unit 217 of the processor 210 extracts data corresponding to the stratum information by searching for a character string corresponding to the item to be extracted according to the form information for the boring log that has been input from the classification model 212 (S350).

The stratum information extraction unit 217 of the processor 210 generates a dictionary including 'elevation', 'depth', 'stratum thickness', 'stratum name', 'soil color', 'stratum description', 'USCS', 'detail', and 'new_USCS' to be included in the stratum information, searches for a character string corresponding to the item to be extracted, determines the location of the data to be extracted according to the form information, and extracts and stores data at the location as information.

In this case, when information about the USCS is not specifically described in the boring log, the stratum information extraction unit 217 of the processor 210 infers the value of 'new_USCS' from the description of 'detail', and extracts and stores the inferred value. To this end, the stratum information extraction unit 217 of the processor 210 extracts the stratum information by estimating the USCS from the major and minor constituent materials in the strata detailed description, when the stratum name corresponds to the soil stratum.

For example, the stratum information extraction unit 217 of the processor 210 generates a USCS classification code by searching for "A-B" or A-mixed B" in "Remarks" when the USCS is not extracted and the ground is soil, and matching, when there are corresponding details, a minor classification (A) (minor constituent) and a major classification (B) (major constituent) from the corresponding details.

First, the stratum information extraction unit 217 of the processor 210 assigns major classification codes based on major constituent materials, according to a major classification criteria described in Table 1 below.

TABLE 1

| Major constituent (B) | Major classification | Example |
| --- | --- | --- |
| Gravel | G | Sandy gravel, Clay-mixed gravel layer |
| Sand | S | Gravel sand, Silt-mixed sand layer |
| Silt | M | Clay silt layer, Sand-mixed silt layer |
| Clay | C | Gravel clay layer, Sand-mixed clay layer |

Next, the stratum information extraction unit 217 of the processor 210 generates USCS classification codes by assigning minor classification codes based on minor constituent materials, according to a minor classification criterion described in Table 2 below. In this case, the minor classification codes are changed depending on major classification codes.

TABLE 2

| Major classification | Minor constituent | Minor classification | USCS | Example |
| --- | --- | --- | --- | --- |
| Gravel (G) | Sand | W (or P) | GW (or GP) | Sandy gravel, Sand-mixed gravel layer |
|  | Silt | M | GM | Silty gravel, Silt-mixed gravel layer |
|  | Clay | C | GC |  |
| Sand (S) | Gravel | W (or P) | SW (or SP) | Gravel sand, Gravel-mixed sand layer |
|  | Silt | M | SM | Silty sand, Silt-mixed sand layer |
|  | Clay | C | SC | Clay sand, Clay-mixed sand layer |

TABLE 2-continued

| Major classification | Minor constituent | Minor classification | USCS | Example |
|---|---|---|---|---|
| Silt (M) | Gravel | L | ML | Gravel silt layer, Gravel-mixed silt layer |
|  | Sand | L | ML | Sand silt layer, Sand-mixed silt layer |
|  | Clay | H | MH | Clay silt layer, Clay-mixed silt layer |
| Clay (C) | Gravel | L | CL | Gravel clay layer, Gravel-mixed clay layer |
|  | Sand | L | CL | Sand clay layer, Sand-mixed clay layer |
|  | Silt | H | CH | Silty clay, Silt-mixed clay layer |

In addition, when a description such as "B contains A" or "B is mixed with A" is given in "Remarks" (e.g., 'Clay . . . contains (is mixed with) . . . sand'), the stratum information extraction unit 217 of the processor 210 generates the USCS by substituting B for the major classification and A for the minor classification in Table 1 and Table 2.

Meanwhile, when the ground is rock, the stratum information extraction unit 217 of the processor 210 defines "academic stratum name (USCS)" based on "stratum name", that is, the definition is done as follows: weathered rock="WR", soft rock="SR", normal rock="NR", hard rock="HR".

When all of the basic information, SPT information, and stratum information are extracted through the above process, the data generation unit 218 of the processor 210 may insert the extracted information into the data frame to generate data to be stored in the database (S360), convert the generated data into a predefined data file format (e.g., Microsoft's EXCEL file format), and store the converted data in the internal memory 220, or transmit the converted data to the database server 100 and store it in the database server 100 (S370).

In this case, according to the selection of the user in step S323, the data generation unit 218 of the processor 210 may generate data so that the basic information and the SPT information are associated with each other, may generate data so that the basic information and the stratum information are associated with each other, and may generate data so that the basic information, the SPT information, and the stratum information are associated with one another.

FIG. 5 is a diagram showing an example of a data file generated so that basic information and SPT information are extracted and associated with each other, and FIG. 6 is a diagram showing an example of a data file generated by extracting stratum information.

The present invention can make a database of boring logs with high reliability without input errors by training a classification model using various forms of boring logs in advance by using artificial intelligence, identifying a form of a boring log to be actually stored in a database using the classification model when the boring log is input, and then extracting data from the boring log according to the identified form.

The method for automatically storing boring logs information using artificial intelligence in accordance with a preferred embodiment of the present invention described above may be implemented as a computer program stored in a non-transitory storage medium by being implemented as computer-executable instructions.

The storage medium includes all kinds of recording devices in which data that may be read by a computer system is stored. Examples of computer-readable storage media include read only memory (ROM), random access memory (RAM), compact disc ROMs (CD-ROM), magnetic tapes, floppy disks, and optical data storage devices. In addition, the computer-readable storage medium may be distributed in a computer system connected through a network, so that the computer-readable code may be stored and executed in a distributed manner.

As described above, the present invention has been shown and described with reference to preferred embodiments thereof. It will be understood by those skilled in the art that various modifications in form may be made therein without departing from the spirit and scope of the invention as defined by the appended claims. Therefore, the disclosed embodiments should be considered in an illustrative sense and not for purposes of limitation. The scope of the invention is defined not by the detailed description of the invention but by the appended claims, and all differences within the scope will be construed as being included in the invention.

What is claimed is:

1. A method for automatically storing boring logs information using artificial intelligence that is performed in a system for automatically storing boring logs information, the method comprising:
   (a) training a deep learning-based classification model by converting a plurality of boring log files into images;
   (b) generating form information by applying, to the classification model, a boring log input for information extraction to identify a form of the boring log;
   (c) selecting information to be extracted from among standard penetration test (SPT) information and stratum information and generating a data frame including basic information and selected information;
   (d) extracting basic information and extracting at least one of the standard penetration test (SPT) information and the stratum information, from the boring log according to the form information; and
   (e) generating data to be stored in a database using the extracted information, wherein
   the step (d) comprises extracting the basic information and the information selected in the step (c),
   the step (e) comprises generating data to be stored in the database by inserting the information extracted in the step (d) into the data frame generated in the step (c),
   the step (c) comprises converting the boring log into a text file, and
   the step (d) comprises extracting information by searching for a character string of an item corresponding to data to be extracted and determining a location of the data to be extracted according to the form information.

2. The method of claim 1, wherein the step (d) comprises extracting unified soil classification system (USCS) information by estimating a USCS from a major constituent material and a minor constituent material in a strata detailed description when the USCS information is not included in the stratum information in the boring log.

3. The method of claim 2, wherein the step (d) comprises extracting the USCS information by estimating the USCS by substituting the major constituent material and the minor constituent material in the strata detailed description into the following table when the USCS information is not included in the stratum information in the boring log:

| Major constituent | Major classification | Minor constituent | Minor classification | USCS |
|---|---|---|---|---|
| Gravel | G | Sand | W (or P) | GW (or GP) |
| | | Silt | M | GM |
| | | Clay | C | GC |
| Sand | S | Gravel | W (or P) | SW (or SP) |
| | | Silt | M | SM |
| | | Clay | C | SC |
| Silt | M | Gravel | L | ML |
| | | Sand | L | ML |
| | | Clay | H | MH |
| Clay | C | Gravel | L | CL |
| | | Sand | L | CL |
| | | Silt | H | CH. |

4. The method of claim 1, wherein the step (a) comprises converting a plurality of boring log portable document format (PDF) files to JPG image files, performing the training in a k-fold validation method by inputting the converted JPG image files into a convolution neural network (CNN) type classification model, and verifying performance by using a confusion matrix.

5. A computer program that is stored in a non-transitory storage medium and executed in a computer including a processor, the computer program performing the method for automatically storing boring logs information using artificial intelligence according to claim 1.

6. A system for automatically storing boring logs information using artificial intelligence, the system comprising:
a processor; and
a memory configured to store predetermined instructions, wherein the processor executing the instructions stored in the memory executes:
a step (a) of training a deep learning-based classification model by converting a plurality of boring log files into images;
a step (b) of generating form information by applying, to the classification model, a boring log input for information extraction to identify a form of the boring log;
a step (c) of selecting information to be extracted from among standard penetration test (SPT) information and stratum information and generating a data frame including basic information and selected information;
a step (d) of extracting basic information and extracting at least one of the standard penetration test (SPT) information and the stratum information, from the boring log according to the form information; and
a step (e) of generating data to be stored in a database using the extracted information, wherein
in the step (d), the processor extracts the basic information and the information selected in the step (c),
in the step (e), the processor generates data to be stored in the database by inserting the information extracted in the step (d) into the data frame generated in the step (c),
in the step (c), the processor converts the boring log into a text file, and
in the step (d), the processor extracts information by searching for a character string of an item corresponding to data to be extracted and determining a location of the data to be extracted according to the form information.

7. The system of claim 6, wherein in the step (d), the processor extracts unified soil classification system (USCS) information by estimating a USCS from a major constituent material and a minor constituent material in a strata detailed description when the USCS information is not included in the stratum information in the boring log.

8. The system of claim 7, wherein in the step (d), the processor extracts the USCS information by estimating the USCS by substituting the major constituent material and the minor constituent material in the strata detailed description into the following table when the USCS information is not included in the stratum information in the boring log:

| Major constituent | Major classification | Minor constituent | Minor classification | USCS |
|---|---|---|---|---|
| Gravel | G | Sand | W (or P) | GW (or GP) |
| | | Silt | M | GM |
| | | Clay | C | GC |
| Sand | S | Gravel | W (or P) | SW (or SP) |
| | | Silt | M | SM |
| | | Clay | C | SC |
| Silt | M | Gravel | L | ML |
| | | Sand | L | ML |
| | | Clay | H | MH |
| Clay | C | Gravel | L | CL |
| | | Sand | L | CL |
| | | Silt | H | CH. |

9. The system of claim 6, wherein in the step (a), the processor converts a plurality of boring log portable document format (PDF) files to JPG image files, performs the training in a k-fold validation method by inputting the converted JPG image files into a convolution neural network (CNN) type classification model, and verifies performance by using a confusion matrix.

* * * * *